(12) United States Patent
Kawamura et al.

(10) Patent No.: US 6,187,850 B1
(45) Date of Patent: Feb. 13, 2001

(54) SEALANT COMPOSITION

(75) Inventors: Masato Kawamura, Ama-gun; Akira Mabuchi, Nagoya; Koji Wakabayashi, Nakashima-gun; Etsuro Mori, Kasugai; Yoshihiro Miura, Ogaki, all of (JP)

(73) Assignee: Toyoda Gosei Co., Ltd., Aichi-ken (JP)

( * ) Notice: Under 35 U.S.C. 154(b), the term of this patent shall be extended for 0 days.

(21) Appl. No.: 09/349,243

(22) Filed: Jul. 8, 1999

(30) Foreign Application Priority Data

Jul. 8, 1998 (JP) .................................................. 10-193368
Mar. 16, 1999 (JP) .................................................. 11-076060

(51) Int. Cl.$^7$ ....................................................... C08K 3/00
(52) U.S. Cl. ........................... 524/425; 524/492; 524/495
(58) Field of Search ................................... 524/425, 492, 524/493, 495

(56) References Cited

U.S. PATENT DOCUMENTS

| 3,652,380 | * | 3/1972 | Strack .................................. 161/255 |
| 4,908,411 | * | 3/1990 | Kinoshita et al. .................... 525/285 |
| 5,332,784 | * | 7/1994 | Shiraki et al. ........................ 525/98 |
| 5,858,521 | * | 1/1999 | Okuda et al. ........................ 428/219 |

* cited by examiner

*Primary Examiner*—Edward J. Cain
(74) *Attorney, Agent, or Firm*—Pillsbury Madison & Sutro LLP

(57) ABSTRACT

The sealant composition disclosed herein is favorable for sealing car parts. The sealant composition is charged inside the trim of a weather strip of a car so as to seal the gap between the trim and the plate flange as inserted inside the trim. The sealant composition comprises a liquid rubber as the base component, a tackifier and a thixotropy promoter as secondary components, and a nonvolatile plasticizer and/or a process oil as the dispersion medium.

14 Claims, 7 Drawing Sheets

SEALANT COMPOSITION

Priority is claimed from Japanese Patent Application No. Hei. 10-193368 filed on Jul. 8, 1998 and Japanese Patent Application No. Hei 11-70760 filed on Mar. 16, 1999, the complete disclosures of which are incorporated herein by reference.

BACKGROUND OF THE INVENTION
1. Field of the Invention

The present invention relates to a novel sealant composition and to a method for preparing the sealant composition. The sealant composition of the invention is especially favorable for sealing vehicle parts, such as car parts. For example, when filled inside the weather strip of a vehicle, the sealant composition seals the gap between the trim and the plate flange when the plate flange is inserted inside the trim.

The embodiment described herein uses a weather strip for a trunk lid; however, the invention is not limited to this embodiment. The sealant composition of the invention is applicable to any other weather strips, such as lift gates. The sealant composition can also be used for other purposes, such as sealing plate-to-plate gaps or plate-to-rubber gaps.

2. Description of the Related Art

A general example of an ordinary sealant applied to a trunk lid weather strip is described with reference to FIG. 1 and FIG. 2.

FIG. 2 is a sectional view of the cross section of FIG. 1 as cut along line 2—2. In FIG. 2, the weather strip 12 comprises a trim 14, a hollow seal 16 and a seal lip 18. The trim 14 is provided with two pairs of pinching lips 20 and 22 therein, and a plate insert 24 is embedded in the trim 14. The plate insert 24 is for retaining the shape of the trim 14 and for ensuring the pinching force of the lips 20 and 22.

A sealant S is charged in the bottom of the trim 14, and the weather strip 12 is fitted to the plate flange 26 of the trunk via the trim 14. In this condition, an end portion of the plate flange 26 is inserted into the sealant S. In FIG. 2, 27 (dotted line) is a trunk lid.

The sealant ensures the plate flange is rust-proof and seals the inside of the weather strip trim well.

Table 1 shows one conventional sealant composition applicable to the site illustrated in FIGS. 1 and 2.

The conventional sealant composition (listed as the comparative example in Table 1) indispensably requires an organic solvent (for example, kerosene) to dissolve the base component, butyl rubber, to produce a predetermined viscosity.

Typical organic solvents for that purpose are generally toxic and volatile, and have the following problems:

(1) The organic solvents require special care to ensure safe working environments in the process of sealant production and coating. Organic solvents can also cause global environment protection problems, thus requiring the release (vaporization) of solvents from sealants to be minimized as much as possible.

(2) Fresh sealants just after production are tacky and stringing. Therefore, in charging the sealants in a desired site, the sealants often adhere to other parts, thus adversely affecting the charging of the sealants. In addition, the fluidity of the sealants is high. Therefore, after the sealant has been charged inside the trim, it is impossible to turn the trim upside down so as to continuously fit the weather strip to the plate flange. On the other hand, if the trim has been left too long after charging with the sealant, the organic solvent vaporizes from the sealant and the viscosity of the sealant increases. In that condition, the load for inserting the plate flange into the trim increases, and this increased load has negative influences on the weather strip fitting operation.

SUMMARY OF THE INVENTION

It is an object of the invention to provide a sealant composition which is free, or at least substantially free, of volatile organic solvent so that the sealant composition is not volatile (non-drying), and which exhibits a sealability comparable to or higher than that of conventional sealants. To attain the above and other objects, the invention is characterized by the following composition.

The sealant composition of the invention comprises, as ingredients, at least one liquid rubber as the base component, at least one tackifier and at least one thixotropy promoter as secondary components, and at least one nonvolatile plasticizer and/or at least one process oil as the dispersion medium.

Preferably, the tackifier is a combination of a liquid tackifier and a resinous tackifier. More preferably, the liquid tackifier is a liquid polybutene.

Also preferably, the liquid rubber is a liquid NBR, the nonvolatile plasticizer is a diphthalate with an alcohol moiety having from 7 to 12 carbon atoms; and the process oil is a paraffinic process oil.

Still preferably, the thixotropy promoter is a powdery calcium carbonate.

In accordance with a preferred method of making the sealant composition, the liquid rubber and other secondary components are uniformly dispersed in a nonvolatile plasticizer or a process oil in a stirring mixer equipped with a rotating and revolving stirrer.

In the process where the tackifier is a combination of a liquid tackifier and a resinous tackifier, resinous tackifier desirably is ground and then dissolved or dispersed in the nonvolatile plasticizer or the process oil.

The non-drying sealant composition of the invention contains no solvent, or at least is substantially solvent free, so that the composition overcomes the problems (i.e., pollution of the environment and time-dependent change in physical properties) of solvent-containing sealants. In addition, the sealant charging operation with the composition is no more complicated than charging operations for solvent-containing sealants, and the sealing characteristics of the composition is comparable to or higher than those of solvent-containing sealants.

The composition of the invention that comprises a process oil but not a plasticizer as the dispersion medium is easy to apply to weather strips of which the trim is of an insertless type, i.e., without insert 24. This is because the composition containing the process oil causes only minor swelling of the rubber substrate and the trim is not swollen to lower its mechanical strength.

DESCRIPTION OF THE PREFERRED EMBODIMENTS

Figure 1:
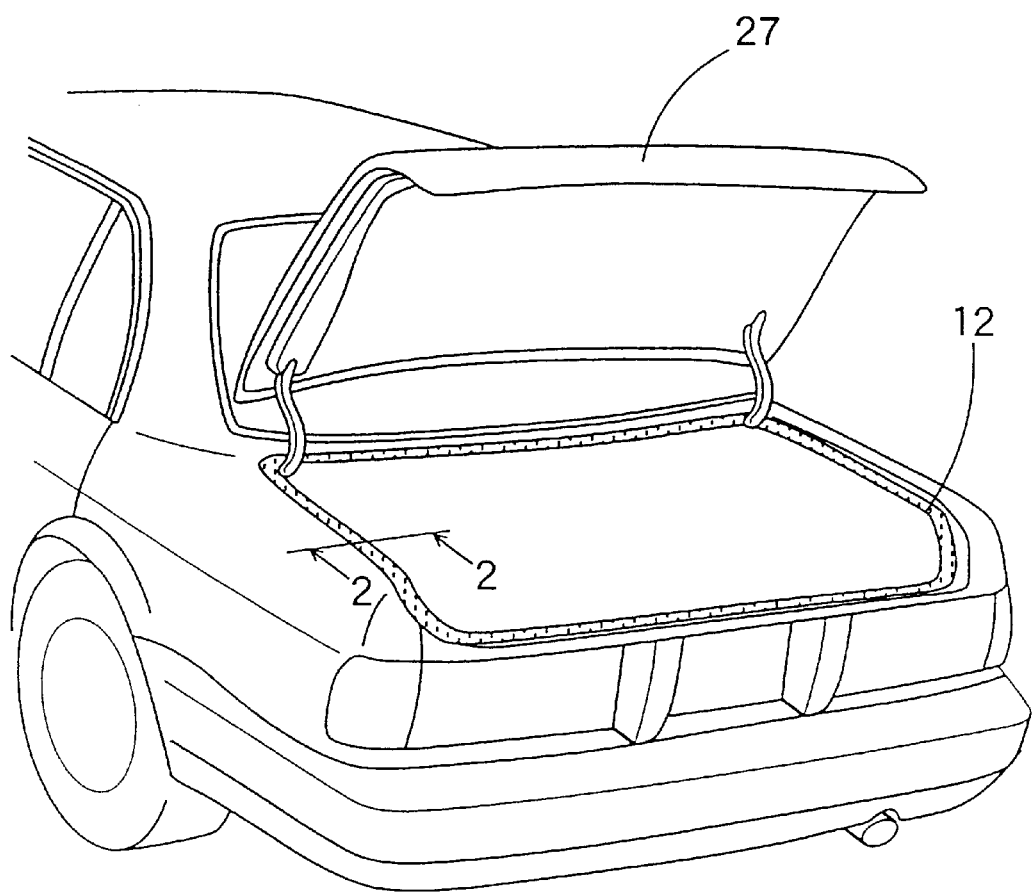
FIG. 1 is a perspective view of a schematic of the rear portion of a car in which a trunk lid weather strip is fitted. The trunk lid weather strip illustrated is one example of weather strips to which the sealant composition of the invention can be applied.
Figure 2:
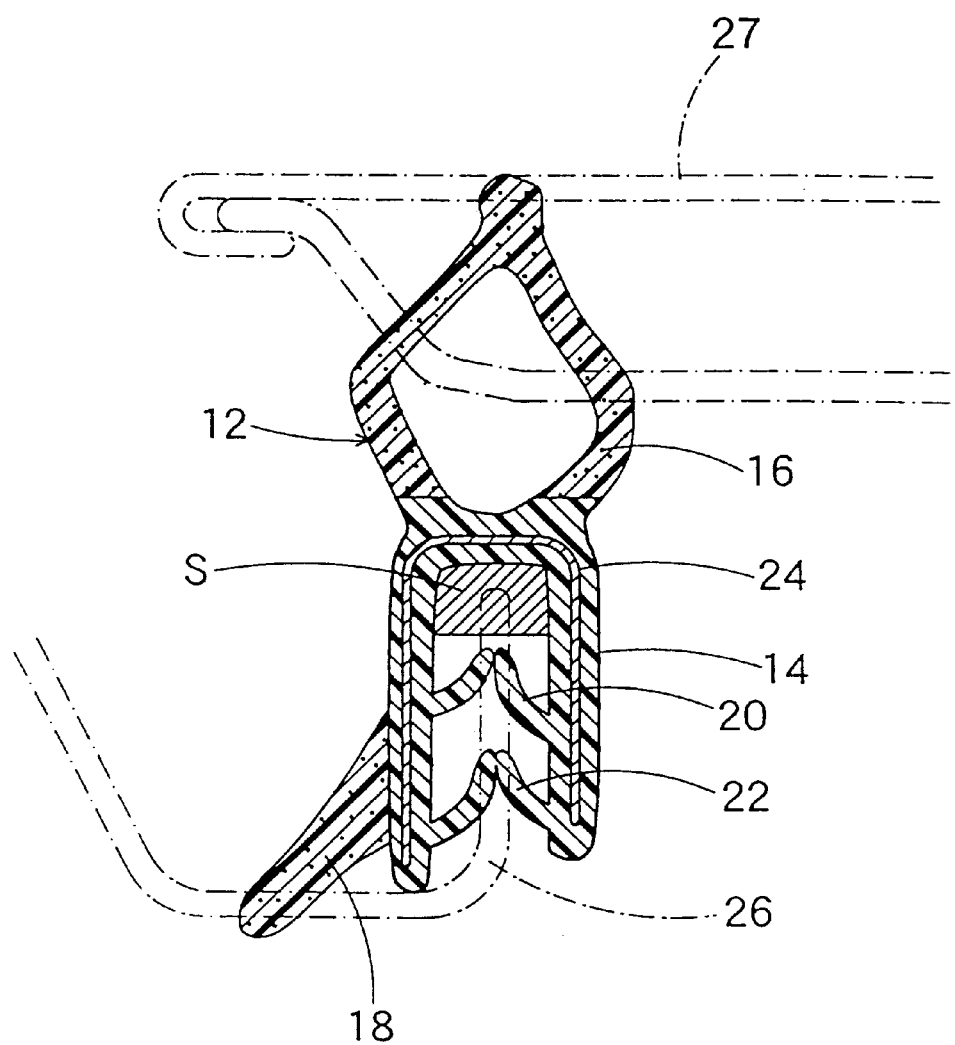
FIG. 2 is a sectional view of the weather strip of FIG. 1 taken along the line 2—2. The weather strip is illustrated as having been charged with a sealant.

Embodiments of the invention are described below with reference to the accompanying drawings. The invention is not limited to the illustrated embodiments, but encompasses all changes and modifications and even their analogues, as encompassed within the scope and the spirit of the appended claims.

The constitution of the invention is described in detail hereinunder. The "sealant composition" may be referred to simply as "sealant".

A. Description of Sealant Composition (1) Base Component

The sealant composition comprises a liquid rubber as the base component.

The liquid rubber is the essential component that exhibits the sealing activity of the sealant. The liquid rubber has a rubber-like elasticity in the sealant. The liquid rubber preferably is liquid at room temperature, and has a molecular weight of from about 2000 to about 10,000 g/mol. Though not an indispensable requirement, the polymer chain of the liquid rubber may be terminated with any stabilizing functional group, such as —OH, —SH, —NH$_2$, —COOH, —NCO, —Br or the like so as to stabilize the polymer. (See "Synthetic Rubber Handbook", New Edition, edited by S. Kanbara and three others, published by Asakura Publishing Co., Nov. 30, 1967, p. 21).

A conventional liquid rubber can be used, such as any rubber formed monomers comprising one or more dienes, for example, liquid, low-molecular butyl rubber, liquid polyisoprene, polybutadiene, 1,2-polybutadiene, polychloroprene, etc. The preferred liquid rubber is liquid NBR having a molecular weight of from 3000 to 10,000 g/mol and a nitrile content of from 15 to 50% by weight (but preferably from 25 to 30% by weight). This rubber is preferred because it is resistant to oil found in car parts and exhibits good compatibility with the nonvolatile plasticizer (generally having polarity) which replaces the organic solvents in the sealant composition. As referred to herein, compatibility means an ability to be mixed homogeneously (e.g., with the plasticizer) without requiring solubility.

(2) Secondary Components

The sealant composition comprises a tackifier and a thixotropy promoter as secondary components, and contains a nonvolatile plasticizer or a process oil as the dispersion medium (matrix).

The preferred tackifier is a combination of a liquid tackifier (i.e., liquid at room temperatures of about 0° C. to about 50° C. ) and a resinous tackifier (i.e., solid at room temperatures). The liquid tackifier, if used alone, does not make the sealant sufficiently adherant to plates, and raises the fluidity of the sealant too high. Also, when the liquid tackifier is used alone and the sealant is gelled, the gelled sealant does not have adequate rigidity. On the other hand, when there is no liquid tackifier in the sealant, the sealant requires a relatively large amount of resinous tackifier. Howeover, large amounts of the resinous tackifier do not dissolve well in the dispersion medium and lower the rubber-like elasticity of the sealant.

The ratio by weight of the liquid tackifier to the resinous tackifier may be from 2:8 to 7:3, but preferably is from 3:7 to 6:4.

Any conventional liquid tackifier may be used, such as, by way of example, liquid polybutene, liquid polybutadiene (having a molecular weight of from 1000 to 4000 g/mol), polymerized specialty polyester (a petroleum hydrocarbon resin available under the trademark SYNTAC EP from Kobe-Abura-Kagaku Co. of Japan), turpentine tackifiers, and other commercially-available special preparations. (See "Chemicals for Rubber and Plastic Preparations" edited and published by Rubber Digest Co., Oct. 15, 1974, pp. 139, 140, 142, 143, etc.).

The preferred liquid tackifier is liquid polybutene, because of its good balance between tackifiability and solubility in (i.e., compatibility with) plasticizers. Also, liquid polybutene is readily available. Liquid polybutene having a mean molecular weight of from 500 to 1500 g/mol, more preferably having a mean molecular weight of from 900 to 1500 g/mol, is preferred. Examples of commercially available liquid polybutene products include "Idemitsu Polybutene 100R (mean molecular weight: 940) and 300R (mean molecular weight: 1330) from Idemitsu Petrochemical.

The resinous tackifier for use in the invention includes petroleum resins, coumarone-indene resins, phenol-formaldehyde resins, xylene-formaldehyde resins, polyterpene resins, rosin esters, and the like. Of those, preferred are petroleum resins. The petroleum resins are thermoplastic resins to be prepared by cationically polymerizing a mixture of cracked oil distillates of petroleum in the presence of a catalyst. The petroleum resins have a relatively low solution viscosity and are easy to process. Therefore, petroleum resins are suitable for use in the sealants.

(3) Nonvolatile Plasticizer

The nonvolatile plasticizer used for the dispersion medium in the sealant composition of the invention should be nonvolatile and compatible or miscible with the liquid rubber and the secondary components noted above. For example, the nonvolatile plasticizer includes aromatic carboxylates, esters of aliphatic dibasic acids, phosphates, epoxy plasticizers, and the like. In general, the preferred diphthalates comprise one or more alcohol moieties having from 7 to 12 carbon atoms, in which the alcohol moiety is more preferably branched.

In the diphthalates, if the alcohol moiety has too few carbon atoms, the diphthalates are volatile and lack cold resistance and waterproofing properties. On the other hand, diphthalates comprising an alcohol moiety with too many carbon atoms are incompatible with the liquid rubber and the other secondary components. In the diphthalates, the higher alcohol moiety is more preferably branched because the diphthalates with branched higher alcohols have better oil resistance and migrate less.

Preferred are di-(2-ethylhexyl) phthalate (DOP), di-n-octyl phthalate, dinonyl phthalate, diisononyl phthalate (DINP), diisodecyl phthalate, diundecyl phthalate, and the like.

In place of the nonvolatile plasticizer noted above, a process oil may be used as the dispersion medium. Like the nonvolatile plasticizer, the process oil is compatible or miscible with the liquid rubber and the side components noted above. Any ordinary process oil is usable herein, including, for example, paraffinic process oils, naphthenic process oils, aromatic process oils, etc. Of those, paraffinic process oils are preferred because the paraffinic process oils are wettable (compatible) with a weather strip material of EPDM.

(4) Thixotropy Promoter

The thixotropy promoter is used to facilitate the operation of charging the sealant into the bottom of a trim and to facilitate the operation of inserting a plate flange into the charged sealant. Also, the thixotropy promoter gels the sealant to make the sealant fluid.

The thixotropy promoter for use in the invention has the ability to gel due to its mutual aggregation force. The thixotropy promoter can comprise organic or inorganic fine grains. In view of their heat resistance and gelling power, preferred are inorganic fine grains with surface activity. Representative inorganic fine grains include, for example, heavy calcium carbonate, fine grains of calcium carbonate, carbon black, silica powder (white carbon) and the like having a grain size of from 0.05 to 3 $\mu$m. Of those, calcium carbonate grains are preferred. Carbon black and silica powder will increase the viscosity of the sealant composition more, thereby adversely influencing the chargeability of the sealant composition.

(5) Concentrations

The proportions of the components that constitute the sealant composition of the invention should be within a range within which the sealant composition has the above-discussed characteristics (i.e., wettability with plates, plasticity, rubber-like elasticity, heat resistance, rigidity for retaining predetermined shapes, etc.). In general, the proportions may be as follows:

Liquid rubber: from 2 to 8 wt. % (preferably, from 4 to 6 wt. %)

Tackifier: from 10 to 30 wt. % (preferably, from 15 to 25 wt. %)

liquid tackifier/resinous tackifier=
from 3:7 to 7:3 (preferably, from 4:6 to 6:4)

Plasticizer or process oil:
from 10 to 50 wt. % (preferably, from 15 to 40 wt. %)

Thixotropy promoter:
from 40 to 70 wt. % (preferably, from 50 to 60 wt. %)

Figure 3A:
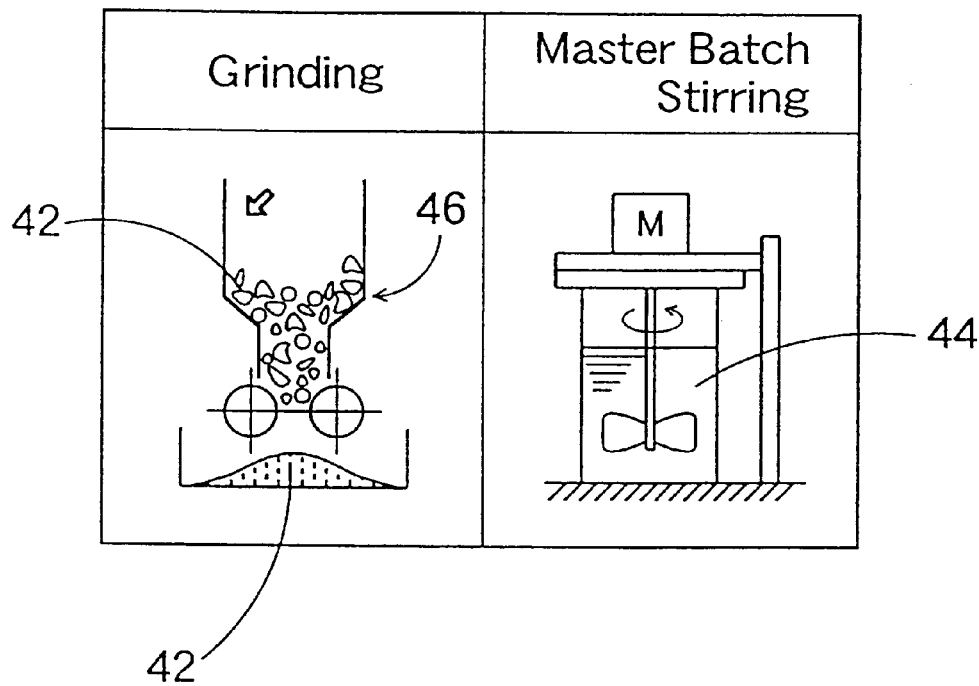
FIG. 3A and FIG. 3B show one example of steps of a process for producing the sealant composition of the invention.
Figure 3B:
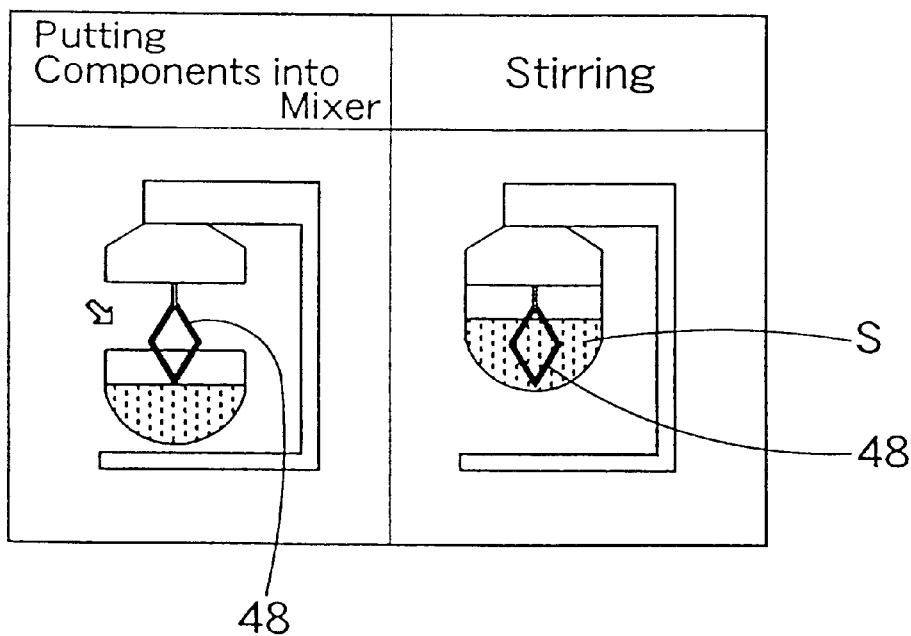

B. Preparation of Sealant Composition:

The sealant composition may be prepared in the manner mentioned below (see FIG. 3A and FIG. 3B).

(1) A resinous tackifier 42 is ground and then dissolved or dispersed in the nonvolatile plasticizer or process oil noted above to prepare a master batch 44 of the dispersion medium. The resinous tackifier, prior to grinding, is generally in the form of bulky grains having a grain size of at least 1 cm. At this size, the resinous tackifier is difficult to directly dissolve or disperse, or requires long periods of time for direct dissolution or dispersion.

The grain size of the ground resinous tackifier preferably falls between 0.3 and 3 mm. An intermediate grinder is used for the grinding. However, the grinding process is not so limited. For example, a roll crusher 46 as illustrated may be used.

For dissolving or dispersing the ground resinous tackifier, any ordinary mixer may be used, in which the ground resinous tackifier may be dissolved or dispersed in a plasticizer or process oil such as that noted above, while being heated at a temperature not lower than the softening point of the resinous tackifier (for example, at a temperature not lower than 70° C.).

(2) Next, the liquid components are added to and mixed with a thixotropy promoter such as that noted above, still with stirring, to prepare a gelled sealant S.

For stirring and mixing them, preferably a stirring mixer equipped with a so-called planetary type, rotating and revolving stirrer 48 is used. The mixer of that type is hereinafter referred to as a planetary type mixer. For example, the sealant S may be prepared in a stirring mixer, "Aikoh Chemical Mixer" (trade name, from Aikoh-sha), equipped with a high-performance stirrer 48 as illustrated.

The stirring time may take between 20 and 40 minutes, for example, for a batch weighing 200 kg.

C. Sealant Applications

The sealant prepared in the manner mentioned above may be used in any ordinary manner. For example, it may be charged into the bottom of a trim of a weather strip through a sealant cartridge gun or the like, and then a plate flange is inserted thereinto to be fitted into the weather strip.

In the sealant charging process, the solvent-free sealant does not pollute the environment because the sealant does not release solvent, and its physical properties do not change. The charged sealant exhibits stable sealability. In addition, since the sealant strings little and flows little, the sealant charging operation is easy. Moreover, since the viscosity change in the sealant is small during the sealant charging process, the next step of weather strip construction (flange insertion) is simple.

EXAMPLES

The invention is described in more detail with reference to the following Examples. These Examples confirm the above-discussed performance enhancements of the invention as compared with a comparative example, but are not intended to construed as exhaustive of the scope of the invention.

Unless otherwise specified, units are in parts by weight.

(1) Preparation of Sealants:

Different sealants were prepared, according to the formulations indicated in Table 1.

TABLE 1

| Formulation | Comparative example | Example 1 | Example 2 | Example 3 | Example 4 |
|---|---|---|---|---|---|
| Base Component | | | | | |
| Butyl Rubber | 11 | 0 | 0 | 0 | 6 |
| Liquid NBR | 0 | 4.5 | 4.5 | 4.5 | 4 |
| Liquid Tackifier | | | | | |
| Polybutene | 12 | 9.5 | 9.5 | 9.5 | 7 |
| Resinous Tackifier | | | | | |

TABLE 1-continued

| Formulation | Comparative example | Example 1 | Example 2 | Example 3 | Example 4 |
|---|---|---|---|---|---|
| Petroleum Resin | 13 | 11 | 11 | 11 | 9 |
| Organic Solvent | | | | | |
| Kerosene | 14 | 0 | 0 | 0 | 0 |
| Dispersion Medium | | | | | |
| DOP | 0 | 20 | 0 | 0 | 0 |
| DINP | 0 | 0 | 20 | 0 | 0 |
| Process Oil | 0 | 0 | 0 | 20 | 34 |
| Thixotropy Promoter | | | | | |
| Heavy Calcium Carbonate | 39 | 27 | 27 | 27 | 15 |
| Fine Grains of Calcium Carbonate | 0 | 27 | 27 | 27 | 30 |
| Carbon Black | 11 | 1 | 1 | 1 | 1 |

The preparation process was as follows

A petroleum resin, sold under the trade name QUINTON R100 by the Nippon Zeon Co., (previously ground to have a mean grain size of 2 mm) was put into a container (20 liters), along with a plasticizer or process oil (process oil was Diana Process Oil PW-380 by the Idemitsu Rosan Co.), (dispersion medium), and stirred under heat at 80° C. for 60 minutes to prepare a master batch of the dispersion medium.

The indicated thixotropy promoter was placed into a planetary mixer (Aikoh Chemical Mixer, having a volume of 5 liters), and stirred therein at 90 rpm for 5 minutes, to which were added the master batch of the dispersion medium, polybutene and liquid NBR, and further stirred at 90 rpm for 30 minutes at room temperature. After being mixed, the ingredients were gelled to give non-drying sealants. These are sealant samples of Examples 1 to 4 of the invention.

Like those sealant samples of the invention, a non-drying sealant sample of a comparative case was prepared in the manner mentioned below.

A petroleum resin (previously ground to have a mean grain size of 2 mm) was put into a container (20 liters), along with kerosene (dispersion medium), and stirred at room temperature for 120 minutes to prepare a master batch of kerosene.

The selected thixotropy promoter was put into the same planetary mixer as above (having a volume of 5 liters), and stirred therein at 90 rpm for 5 minutes, to which were added the master batch of kerosene, polybutene and butyl rubber, and further stirred at 90 rpm for 20 hours. After being mixed, the ingredients were gelled to give a non-drying sealant of a comparative case.

(2) The sealants of Examples 1 to 4 of the invention and the sealant of the comparative case were tested (in accordance with the procedures set forth below) for their properties. The results are set forth in Table 2.

TABLE 2

| Tested Matters | Comparative example | Example 1 | Example 2 | Example 3 | Example 4 |
|---|---|---|---|---|---|
| ① Viscosity (Pa · s) 22° C. | | | | | |
| Initial Viscosity | 630 | 790 | 480 | 620 | 600 |
| Viscosity Change | 6 | 0 | 0 | 0 | 0 |

TABLE 2-continued

| Tested Matters | Comparative example | Example 1 | Example 2 | Example 3 | Example 4 |
|---|---|---|---|---|---|
| ② in Storage Sealability | | | | | |
| Initial Stage | Water leaked | Water not leaked | Water not leaked | Water not leaked | Water not leaked |
| After Aged | Water not leaked | Water not leaked | Water not leaked | Water not leaked | Water not leaked |
| ③ Fluidity, vertical direction/ horizontal direction (mm) | | | | | |
| 50° C. × 5 days | 20 · 18 | 0 · 0 | 0 · 0 | 0 · 0 | 0 · 0 |
| 90° C. × 5 days | 20 · 20 | 0 · 0 | 0 · 0 | 0 · 0 | 0 · 0 |
| ④ Load for Insertion N/100 mm | | | | | |
| Immediate Test | | | | | |
| 5° C. | 0.30 | 0.60 | 0.19 | 0.25 | 0.25 |
| 20° C. | 0.17 | 0.32 | 0.15 | 0.20 | 0.20 |
| 40° C. | 0.16 | 0.29 | 0.15 | 0.17 | 0.19 |
| Initial Stage Test | 0.84 | 0.54 | 0.26 | 0.25 | 0.23 |
| ⑤ Adhesiveness (g) | | | | | |
| Immediate Test | | | | | |
| −10° C. | 0.28 | 2.00 | 0.90 | 0.44 | 0.50 |
| 20° C. | 0.44 | 1.81 | 0.55 | 0.50 | 0.40 |
| 40° C. | 0.45 | 1.72 | 0.65 | 0.36 | 0.49 |
| After Aged | 0.18 | 0.80 | 0.21 | 0.49 | 0.31 |
| ⑥ Rustproofness | Not rusted | Not rusted | Not rusted | Not rusted | Not rusted |
| ⑦ Cobwebbing (cm) | 50.0 | 5.0 | 5.0 | 5.0 | 5.0 |
| ⑧ Specific Gravity | 1.28 | 1.48 | 1.48 | 1.28 | 1.29 |
| ⑨ Degrees of Rubber Swelling (%) | 34 | 16 | 16 | 11 | 10 |

(i) Viscosity:

Each sample was put into a container, and its initial viscosity was measured. After having been sealed, the container was left undisturbed for twenty days. Then, the viscosity of the sample was measured. The conditions for the measurement were as follows:

Viscometer used: BH-type rotary viscometer (Rotor #7, revolution 2 rpm).

Initial viscosity (Pa·s): measured at 20° C.

Viscosity change (%) in stored samples: After the samples were stored at 40° C. for 20 days, their viscosity was measured at 22° C. (JIS K 5400).

Figure 4:
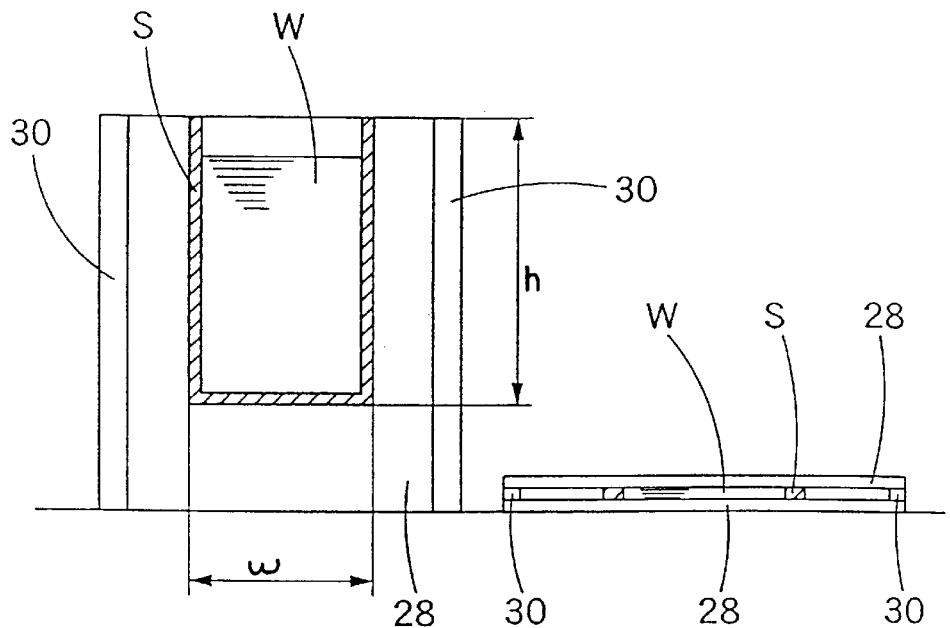
FIG. 4 shows a test device for measuring the sealability of sealants.

(ii) Sealability:

As in FIG. 4, a sealant sample S to be tested was applied onto a glass sheet 28 in such a manner that its cross section was approximately circular to have a diameter of about 5 mm. Another glass sheet was attached to the glass sheet 28 via spacers 30 having a thickness of 3 mm, and fixed with a clip (not shown) to prepare a test structure. Water, W, was put into the space of the test structure having a height h of 60 mm and a diameter w of 40 mm, and the test structure was oriented vertically, as illustrated. The test structure was checked for water leaks under the condition mentioned below.

Initial stage: After standing vertically for 22 hours, the test structure was checked for water leaks, if any.

After aging: The sealant sample was aged at 90° C. for 10 days, and tested in the same manner as above.

Figure 5:
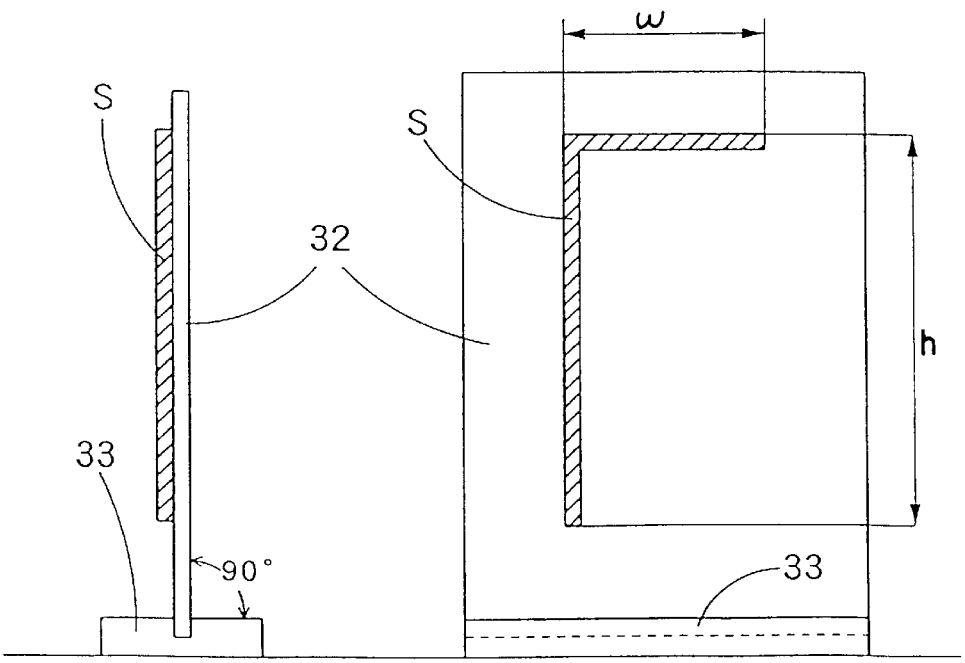
FIG. 5 shows a test device for the measuring fluidity of sealants.

(iii) Fluidity:

As in FIG. 5, a sealant sample S to be tested was applied onto a coated plate 32 in such a manner that its cross section was semi-circular (having a width of about 5 mm and a height of about 2.5 mm). The coated plate 32 was held on a grooved stand 33 under the conditions indicated below, and the maximum flow length (mm) of the sealant S thereon was measured. The height h of sample S was 100 mm, and the width w was 50 mm.

Test condition:
 Left at 50° C. for 5 days.
 Left at 90° C. for 5 days.

Figure 6A:
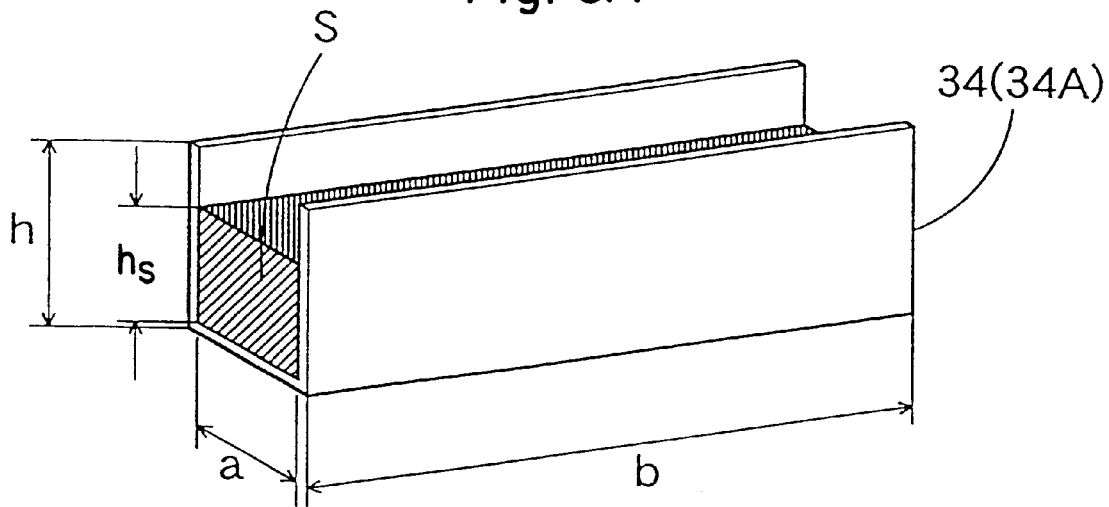
FIG. 6A and FIG. 6B show a test device for the load of flange insertion into sealants and for the sealant adhesiveness to the inserted flange.
Figure 6B:
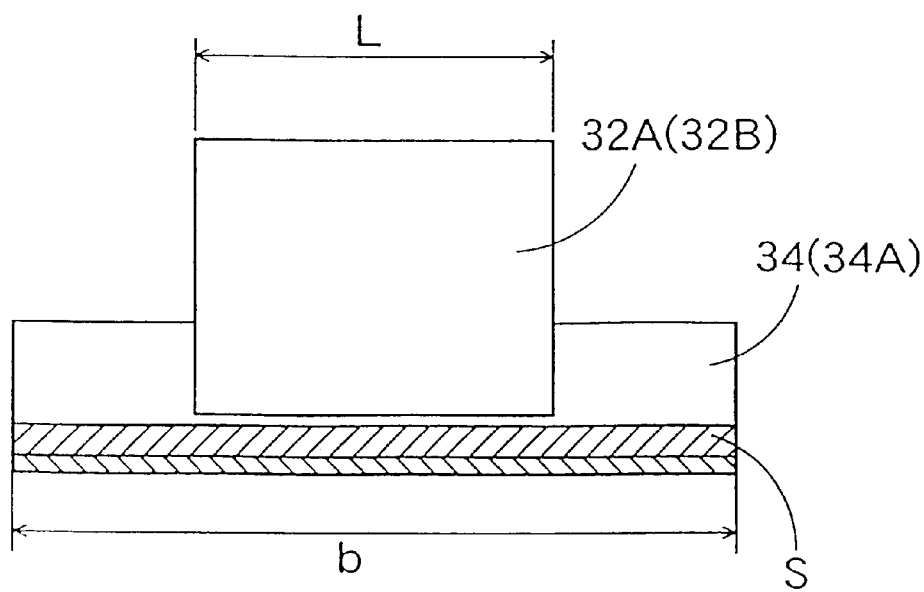

(iv) Load for insertion:

As in FIG. 6A and FIG. 6B, a sealant sample S was charged into a channel 34 (a=13 mm, b=170 mm, h=8 mm) to a height $h_s$ of 4 mm, and a coated plate 32A (L=40 mm, t=2.4 mm) was inserted thereinto at a rate of 20 mm/sec. The load (unit: N/100 mm) for 1 mm insertion was measured.

The temperature in the test was varied as indicated. The temperature in the initial stage test in which the sample as stored at 40° C. for 5 days was tested was room temperature.

(v) Adhesiveness:

As in FIG. 6A and FIG. 6B, a sealant sample S was charged into a channel 34A (a=5.5 mm, b=150 mm, h=9 mm) to a height $h_s$ of 4 mm, and a coated plate 32B (L=100 mm, t=0.8 mm) {t is not shown in the figure} was inserted to the bottom of the channel at its center. After having been left undisturbed for 10 minutes, the coated plate 32B was drawn up at a rate of 200 mm/min, and the mass (g) of the sealant adhered thereto was measured.

The temperature in the initial stage test (after stored at 40° C. for 5 days) was varied as indicated. The temperature in the aged stage test in which the sample as stored at 80° C. for 10 days was tested at room temperature.

Figure 7:
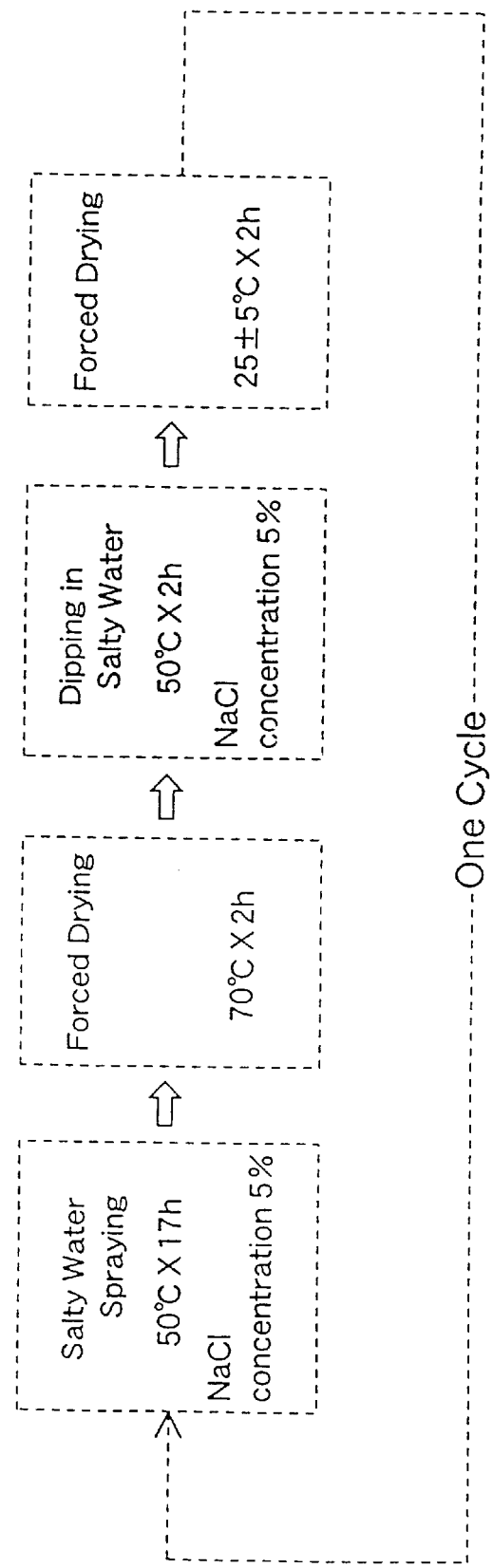
FIG. 7 is the flowchart of a cycle in an accelerated rusting test.

(vi) Rustproof protection:

A coated plate (150 mm×40 mm×0.8 mm thickness) was scratched with a cutting knife, and a sealant sample to be tested was applied thereto in such a manner that its cross section was semi-circular (having a width of about 5 mm and a height of about 2.5 mm). The thus-prepared test plate was subjected to the cycle test depicted in FIG. 7, in which the cycle was repeated 30 times. After the test, the sealant was removed and washed away with a solvent (kerosene). The condition of the scratched part of the test plate was checked for rust.

Figure 8:
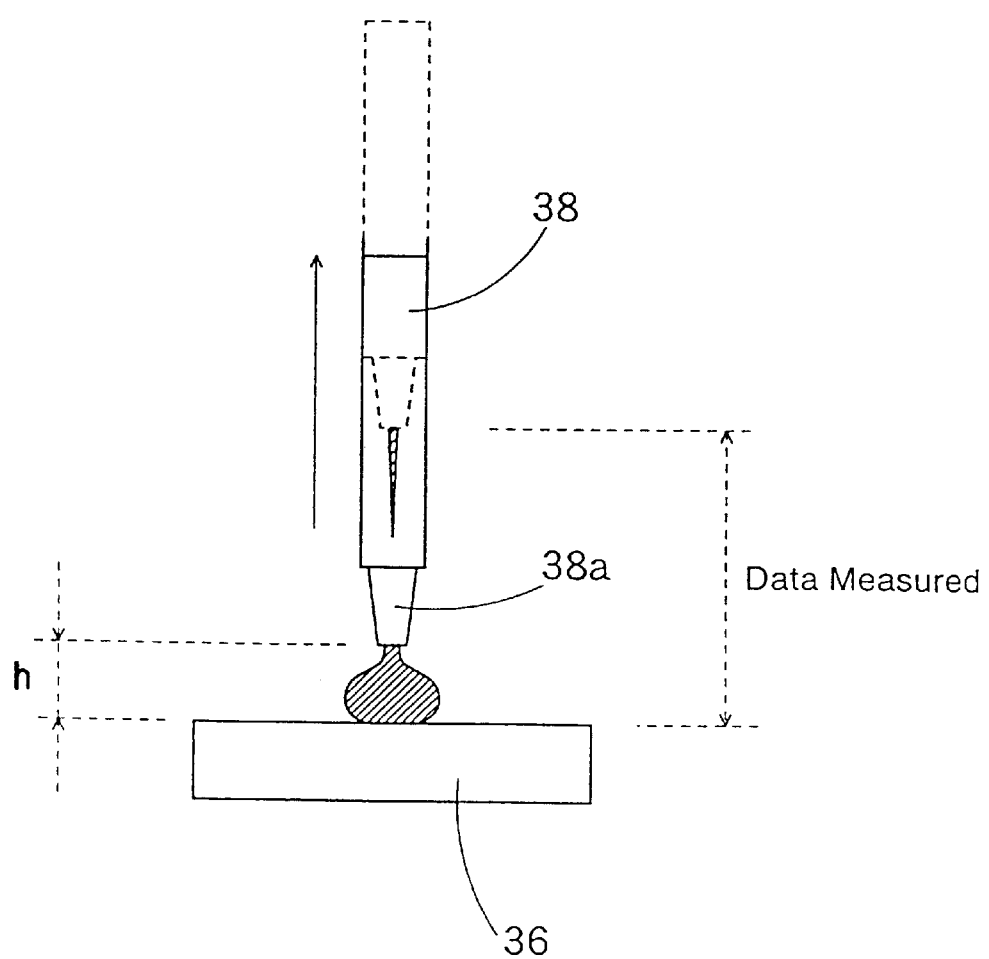
FIG. 8 is an explanatory view of a stringing test.

(vii) Stringing:

As in FIG. 8, a sealant sample S of about 3 g was applied onto a steel plate 36 through a cartridge gun 38 from a height h of 5 mm in such a manner that its cross section could be semi-circular (having a width w of about 5 mm and a height of about 2.5 mm), and the nozzle 38a of the gun was vertically drawn up at a rate of 13 cm/sec, whereupon the moving length (mm) of the nozzle 38a before the stringing sealant S was cut was measured.

(viii) Degree of rubber swelling:

A weather strip rubber composition was extruded and vulcanized to give a sheet having a width of 25 mm and a thickness of 3 mm, and then cut to have a length of 25 mm. The dimensions of the test pieces were 25 mm×25 mm×3 mm.

Formulation of Rubber Composition
 EPDM: 100 parts by weight
 Carbon black: 113 parts by weight
 Process oil (paraffinic process oil): 58 parts by weight
 Stearic acid: 0.8 parts by weight
 Zinc powder: 1.5 parts by weight
 Tackifier: 3.8 parts by weight
 White carbon: 15 parts by weight
 Sulfur: 1.2 parts by weight
 Vulcanization promoter: 3.4 parts by weight
 Foaming agent: 0.8 parts by weight
 *C2 content: 46 to 50%, iodine value: 16 to 18.

The test piece was dipped in the center of a container (200 ml) filled with a sealant sample, and kept sealed for 24 hours. Then, the test piece was taken out, and its weight in air and in water before and after the dipping test were measured. The degree of swelling of the test piece (degree of volume change) was obtained according to the following equation.

$$\text{Degree of Swelling }(\%)=\{W2+W3-(W1+W4)\}\times 100/(W1-W2)$$

wherein W1 and W3 indicate the mass of the test piece in air before and after the test, respectively, and W2 and W4 indicate the mass of the test piece in water (at 20° C.) before and after the test, respectively.

(3) It is understood that the sealants of the invention are superior to the comparative sealant in that the inventive sealants have good sealability, low string and little flow. Also, the insertion load into the inventive sealants (especially in the initial stage) is stable. The charging operation with the sealants of the invention is easier than that with the comparative sealant.

Regarding the degree of swelling of rubber substrates with sealants, it is understood that the sealants comprising a process oil as the dispersion medium swell the rubber substrates to a lower degree than both the sealant comprising an organic solvent and the sealants comprising a plasticizer. It is also understood that the sealants comprising a process oil have a lower specific gravity than those comprising a plasticizer.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A sealant composition suitable for sealing vehicle parts, said sealant composition comprising, as ingredients prior to combination:

a liquid rubber;

a tackifier;

a thixotropy promoter; and at least one dispersion medium selected from the group consisting of a nonvolatile plasticizer and a process oil, the dispersion medium being compatible or miscible with the liquid rubber, the tackifier and the thixotropy promoter, said dispersion medium further being present in an effective amount to permit dispersion of said liquid rubber, said tackifier, and said thixotropy promoter, wherein said sealant composition is substantially free of volatile organic solvents.

2. The sealant composition of claim 1, wherein said tackifier comprises a combination of a liquid tackifier and a resinous tackifier.

3. The sealant composition of claim 2, wherein said liquid tackifier comprises liquid polybutene.

4. The sealant composition of claim 3, wherein said liquid rubber is a liquid NBR and said nonvolatile plasticizer is a diphthalate having an alcohol moiety with 7 to 12 carbon atoms.

5. The sealant composition of claim 4, wherein said thixotropy promoter is calcium carbonate powder.

6. The sealant composition of claim 3, wherein said liquid rubber sealant comprises a liquid NBR and said dispersion medium comprises a paraffinic process oil as said process oil.

7. The sealant composition of claim 6, wherein said thixotropy promoter comprises calcium carbonate powder.

8. The sealant composition of claim 1, wherein said thixotropy promoter comprises calcium carbonate powder.

9. The sealant composition of claim 2, wherein said thixotropy promoter comprises calcium carbonate powder.

10. The sealant composition of claim 3, wherein said thixotropy promoter comprises calcium carbonate powder.

11. The sealant composition of claim 1, wherein said sealant composition comprises 2–8 wt % of said liquid rubber, 10–30 wt % of said tackifier, 40–70 wt % of said thixotropy promoter, and 10–50 wt % of said dispersion medium.

12. A method of preparing a sealant composition, said method comprising mixing and thereby uniformly dispersing a liquid rubber, a tackifier, and a thixotropy promoter with at least one dispersion medium selected from the group consisting of a nonvolatile plasticizer and a process oil, the dispersion medium being compatible or miscible with the liquid rubber, the tackifier and the thixotropy promoter, wherein said sealant composition is substantially free of volatile organic solvents.

13. The method of claim 12, wherein said mixing is performed in a mixer equipped with a rotating and revolving stirrer.

14. A method of preparing a sealant composition, said method comprising mixing and thereby uniformly dispersing a liquid rubber, a tackifier, and a thixotropy promoter with at least one dispersion medium selected from the group consisting of a nonvolatile plasticizer and a process oil, the dispersion medium being compatible or miscible with the liquid rubber, the tackifier and the thixotropy promoter, wherein said tackifier comprises a ground resinous tackifier and a liquid tackifier, and wherein said sealant composition is substantially free of volatile organic solvents.

* * * * *